US009167522B2

(12) United States Patent
Das

(10) Patent No.: US 9,167,522 B2
(45) Date of Patent: Oct. 20, 2015

(54) FAST DETECTION OF DISCONTINUOUS TRANSMISSION

(71) Applicant: Telefonaktiebolaget L M Ericsson (publ), Stockholm (SE)

(72) Inventor: Sajal Kumar Das, Bangalore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 286 days.

(21) Appl. No.: 13/848,322

(22) Filed: Mar. 21, 2013

(65) Prior Publication Data

US 2014/0286210 A1 Sep. 25, 2014

(51) Int. Cl.
H04W 52/02 (2009.01)
H04L 1/20 (2006.01)
H04W 76/04 (2009.01)

(52) U.S. Cl.
CPC ........... *H04W 52/0229* (2013.01); *H04L 1/201* (2013.01); *H04W 76/048* (2013.01); *Y02B 60/50* (2013.01)

(58) Field of Classification Search
None
See application file for complete search history.

(56) References Cited

U.S. PATENT DOCUMENTS

| 5,146,610 | A | * | 9/1992 | Longshore et al. ........... 455/701 |
| 5,936,979 | A | | 8/1999 | Jyrkkä |
| 6,038,238 | A | | 3/2000 | Jokinen et al. |
| 6,370,392 | B1 | | 4/2002 | Li et al. |
| 6,587,447 | B1 | | 7/2003 | Wang et al. |
| 6,725,054 | B1 | | 4/2004 | Hwang et al. |
| 6,904,557 | B2 | | 6/2005 | Tapaninen et al. |
| 7,437,172 | B2 | | 10/2008 | Chen et al. |
| 7,616,712 | B2 | | 11/2009 | Chen |
| 7,782,820 | B2 | | 8/2010 | Dominique et al. |
| 2003/0063576 | A1 | * | 4/2003 | DiFazio ........................ 370/280 |
| 2003/0086379 | A1 | * | 5/2003 | Terry et al. .................... 370/279 |

(Continued)

FOREIGN PATENT DOCUMENTS

| EP | 1804387 A1 | 7/2007 |
| WO | 2005060303 A1 | 6/2005 |
| WO | 2012009461 A1 | 1/2012 |

OTHER PUBLICATIONS

3RD Generation Partnership Project. 3GPP TR 45.914 V8.2.0 (Sep. 2009). 3rd Generation Partnership Project; Technical Specification Group GERAN; Circuit Switched Voice Capacity Evolution for GSM/EDGE Radio Access Network (GERAN). (Release 8). Sep. 2009, pp. 1-286.

(Continued)

*Primary Examiner* — Kerri Rose
(74) *Attorney, Agent, or Firm* — Murphy, Bilak & Homiller, PLLC

(57) ABSTRACT

Techniques for detecting discontinuous transmission (DTX) are disclosed. In an example method, given a sequence of bits that is known by a wireless receiver to be included in transmission bursts targeted to the wireless receiver and given a series of received signal samples corresponding to an expected transmission burst for the wireless receiver, the wireless receiver estimates a channel response and a location for the sequence within the series. The wireless receiver generates a plurality of bit estimates from the subset of received signal samples, based on the estimated channel response, compares the bit estimates to bits in the sequence of bits, and determines whether a valid burst for the wireless receiver is present, based on said comparing. The disclosed techniques are particularly suitable for use in detecting DTX in VAMOS scenarios.

26 Claims, 13 Drawing Sheets

(56) References Cited

U.S. PATENT DOCUMENTS

| | | |
|---|---|---|
| 2003/0095507 A1 | 5/2003 | Chen et al. |
| 2003/0142728 A1 | 7/2003 | Lin |
| 2004/0006462 A1 | 1/2004 | Johnson |
| 2004/0095918 A1 | 5/2004 | Dominique et al. |
| 2009/0201892 A1 | 8/2009 | Guiriec et al. |
| 2012/0115471 A1* | 5/2012 | Awoniyi et al. ............ 455/435.1 |
| 2012/0244817 A1 | 9/2012 | Das et al. |

OTHER PUBLICATIONS

3RD Generation Partnership Project. 3GPP TS 45.008 V11.2.0 (Aug. 2012). 3rd Generation Partnership Project; Technical Specification Group GSM/EDGE Radio Access Network; Radio subsystem link control (Release 11). Oct. 2012, pp. 1-148.

3RD Generation Partnership Project. 3GPP TS 45.002 V11.1.0 (Nov. 2012). 3rd Generation Partnership Project; Technical Specification Group GSM/EDGE Radio Access Network; Multiplexing and multiple access on the radio path (Release 11). Nov. 2012, pp. 1-113.

3RD Generation Partnership Project. "Voice Capacity Evolution with Orthogonal Sub Channels." 3GPP TSG GERAN #36, GP-071792, Nov. 12-16, 2007, pp. 1-12, Vancouver, Canada.

3RD Generation Partnership Project. "Continued Discussion on Supporting DTX for Conversational Services." 3GPP TSG GERAN #42, GP-090647, May 11-15, 2009, pp. 1-5, Shenzhen, China.

3RD Generation Partnership Project. "Impact of DTX on VAMOS Level 2 Terminal Performance." 3GPP TSG GERAN #43, GP-091214, Aug. 31-Sep. 4, 2009, pp. 1-6, Vancouver, Canada.

* cited by examiner

```
//Once the [I,Q] data is received from RF, do dc correction, normalization
and then set the equalizer type to be used and then call channel
estimation function.
equParamBlk.equFront = EQU_SAIC2x;    //set equalizer type
SAIC2x_SyncChEst(equParamBlk);   //call channel estimation function - that
will provide h & TSC position (sync pos)
     int buf_strt_indx = equParamBlk.syncPos;   //TSC start pos
     for(int i=0;i<26;i++)    //copy 26 TSC I,Q bits from the identified
TSC locations to the data part on both side of the TSC e.g. data I,Q
samples are now replaced by TSC I,Q
{
    //replace I,Q in the left side of TSC
    equParamBlk.pRxBufA[buf_strt_indx+i+35] =
equParamBlk.pRxBufA[buf_strt_indx+i+58+3];
    equParamBlk.pRxBufB[buf_strt_indx+i+35] =
equParamBlk.pRxBufB[buf_strt_indx+i+58+3];
    //replace I,Q in the right side of TSC
    equParamBlk.pRxBufA[buf_strt_indx+i+89] =
equParamBlk.pRxBufA[buf_strt_indx+i+58+3];
    equParamBlk.pRxBufB[buf_strt_indx+i+89] =
equParamBlk.pRxBufB[buf_strt_indx+i+58+3];
   }
    SAIC2x_Compute_AGC(equParamBlk);      // For computing AGC parameters
    SAIC2x_DemodBurst(equParamBlk); //call the demodulator for
equalization and demodulation int tsc[26] = {0,1,0,0,1,1,1,0,1,0,1,1,0,0,0,0,0,1,0,0,1,1,1,0,1,0};
//TSC#5 is used here by BTS
    int rxtsc[116] ={0};//demodulated TSC bits on both left and right
side - stored here
    int counttsc_mismatch_left=0;
    int counttsc_mismatch_right=0;
```

*FIG. 15A*

```
//convert the demodulated TSC data part in left and right side to hard
bit format to compare
     for(int t=0;t<116;t++)
    {
     if(equParamBlk.pBurstSoftBits[t+32]>=0)rxtsc[t]=0;
     else rxtsc[t]=1;
     //printf("tscsft=%d\n",rxtsc[t]);
    }
     for(int t=5;t<5+16;t++)//compare 16 positions in the left demod
    TSC with known TSC...
    {
     if(tsc[t]!= rxtsc[t]){counttsc_mismatch_left++;printf("left=%d\
n",t);}

}
     for(int t=5;t<5+16;t++)//compare 20 positions in the right demod
    TSC with known TSC...
    {
     if(tsc[t]!=
rxtsc[t+26+2]){counttsc_mismatch_right++;printf("right=%d\n",t);}

}
//if mismatch count is greater than threshold then no TSC presence
detected e.g. DTX mode
int DTX_mode =0;

if(counttsc_mismatch_right,counttsc_mismatch_left+counttsc_mismatch_
right >= THRESHOLD) DTX_mode = TRUE;
else DTX_mode = FALSE;

printf("counttsc_mismatch:L=%d,R=%d,T=%d\
n",counttsc_mismatch_left,counttsc_mismatch_right,counttsc_mismatch_
left+counttsc_mismatch_right);
```

FIG. 15B

FAST DETECTION OF DISCONTINUOUS TRANSMISSION

TECHNICAL FIELD

The present disclosure is generally related to wireless communication receivers, and is more particularly related to techniques for detecting discontinuous transmission in a wireless receiver.

BACKGROUND

In a typical wireless communication system, the radio link between a user terminal (e.g., a cellular telephone) and the base station serving the user terminal is capable of conveying continuous voice signals in both directions, i.e., from the user terminal to the base station (and on to a remote party) and from the base station to the user terminal. However, in normal conversation, each person speaks on average for less than 50% of the total time. Transmitting radio signals that effectively carry nothing but silence creates unnecessary interference and wastes energy. Likewise, at the receiver end of the link, decoding radio signals carrying no voice signal wastes computing resources and also wastes energy. Accordingly, many wireless systems, including those based on the well-known Global System for Mobile Communications, support a Discontinuous Transmission (DTX) feature that allows the radio transmitter to be switched off during periods when there is no voice signal to be sent.

DTX is enabled by a family of techniques known as voice activity detection (VAD), also known as speech activity detection or speech detection, which are used to detect the presence or absence of human speech in a signal. DTX is a mechanism that allows the radio transmitter to be switched off during periods of no speech activity, to achieve power savings in the user terminal and overall system level interference reduction over the air interface. With DTX, no speech signal is transmitted during the absence of the speech detected by the VAD. This state is known as DTX state.

When the receiver at the other end of the radio link detects that the transmitter has not transmitted speech frames, it marks the frame as 'bad', which is known in GSM specifications as "bad frame indication" (BFI), and generates appropriate comfort noise, so that the user feels that the connection is still active. Generally, in the GSM case, when a transmitter enters the DTX state it transmits a Silence Interval Descriptor (SID) frame after the last speech frame; the SID frame is used by the receiver to generate comfort noise. The transmitter thereafter transmits one SID frame at regular intervals of 480 milliseconds, for so long as there is no voice activity. The signalling of the Slow Associated Control Channel (SACCH) remains active during the DTX period. When a GSM mobile station (MS) is in DTX mode, only twelve TDMA bursts are sent in each 480-millisecond interval; of those, four bursts are for a SACCH frame and eight are for SID frame transmission. Currently, a similar DTX functionality is implemented in almost all mobile communications standards (e.g., GSM, WCDMA, LTE), for the downlink (base-station-to-mobile-terminal) as well as in the uplink (mobile-terminal-to-base-station). Additional information about VAD and DTX can be found in the 3rd-Generation Partnership Project (3GPP) standards directed to specifying speech handling in 3GPP networks, which can be found at http://www.3gpp.org/ftp/Specs/html-info/06-series.htm.

During a DTX period, the receiver at the other end of the link receives only a noise signal, if it opens up a radio frequency (RF) "window" during the no-transmission period. Ideally, the receiver should not process this noise signal. However, DTX condition detection in a receiver is not always easy. Several problems arise if DTX is not reliably detected. For instance, if a speech frame is wrongly detected as silence then the speech carried by that frame will not be played, leading to a degrading of speech performance. On the other hand, if a silence period or no-transmission period is wrongly detected as speech then a noise signal is improperly converted into an audio signal, resulting in poor speech quality and the unnecessary consumption of extra power for processing the signal. Furthermore, Automatic Frequency Control (AFC) and Automatic Time Correction (ATC) values can be wrongly updated from a noise signal burst, which will cause deterioration of the frequency- and time-synchronization of the receiver.

Release 9 of the 3GPP GSM/EDGE Radio Access Network (GERAN) specifications introduces a new feature, called "Voice Services over Adaptive Multi-user channels on One Slot," or VAMOS, which can potentially double the network voice channel capacity by assigning the same time slot and frequency for simultaneous use by two paired mobile stations. More about VAMOS can be found in the 3GPP report, "Circuit switched voice capacity evolution for GSM/EDGE Radio Access Network (GERAN)," 3GPP TR 45.914, v. 11.0.0 (September 2012), available at www.3gpp.org. Additional information can also be found in chapter 11 of Sajal Kumar Das, *Mobile Handset Design*, Wiley (2010).

In the downlink direction, the VAMOS solution introduces an Adaptive QPSK (AQPSK) modulation scheme, in contrast to the Gaussian Minimum-Shift Keying (GMSK) modulation used in prior systems. This enables the scheduling of two users on in-phase (I) and quadrature-phase (Q) subchannels, known as subchannel 1 and subchannel 2, respectively. Allocation of different power levels to each subchannel is also possible. So, one user or MS uses the I channel and the other uses the Q channel, for simultaneous transmission of voice using the same time slot and frequency. A parameter $\alpha$, where $0 \leq \alpha \leq \sqrt{2}$, is chosen to create a quaternary constellation—the resulting constellation points of the AQPSK modulator are: $(\pm \alpha/\sqrt{2}, \pm j\sqrt{(2-\alpha^2)}/\sqrt{2})$. FIG. 1 illustrates an example AQPSK constellation diagram. As seen in the diagram, each symbol contains two bits (one for each mobile station), so there are four points in the constellation. Because the power to the I and Q channels may be imbalanced, the deviations in the I and Q directions of the constellation may differ, as is the case in the example shown in FIG. 1. The ratio of power between the Q and I channels is defined as the Subchannel Power Imbalance Ratio (SCPIR). The value of the SCPIR is given by:

$$SCPIR = 20 * \log 10(\tan(\alpha)) dB = Powersubchannel-2/Powersubchannel-1$$

According to 3GPP TS 45.001, "in downlink, for a VAMOS pair, when DTX is employed for the TCH channels, AQPSK modulation as shown above shall be used when on a given physical resource both the TCH channels in the VAMOS pair have bursts scheduled for transmission simultaneously. If only one of the TCH channels in a VAMOS pair has bursts scheduled for transmission, with the other TCH channel being in DTX state (having no bursts scheduled for transmission, see 3GPP TS 45.008), the BSS shall send GMSK normal bursts. If none of the TCH channels in the VAMOS pair has bursts scheduled for transmission, then nothing is transmitted."

This excerpt from the 3GPP standards indicates that AQPSK modulation is only used if both users have bursts scheduled for transmission. If one of the paired VAMOS users is in DTX state, i.e., the voice transmission for one of the users is interrupted because of speech pauses, and then the base station (a BSS, in GSM terminology) will use traditional GMSK modulation instead of AQPSK. If neither user/sub-channel is active then the network does not send anything, except SID updates and SACCH frame data for GSM. In this condition, both receivers must detect the DTX scenario properly and must also compute the subchannel power imbalance ratio (SCPIR) appropriately. Note that the measured ratio of powers can approach infinity in this scenario, as both powers are ideally zero. This can lead to an improper computation of the SCPIR, if proper care is not taken in the computational algorithm. That might lead to unexpected issues as the SCPIR value is used by the receiver for dynamic detection of interference cancellation, among other things.

The problem of reliably detecting a DTX condition is an old one. Prior patents and patent application publications have addressed this problem in several different ways. For example, US Patent Application Publication 2003/0142728 describes a two-dimensional quality metric, generated using an energy-per-bit-to-noise-power ratio as the first dimension and a re-encoded symbol error count as a second dimension, which is used to characterize the received frame as an erasure or as DTX. U.S. Pat. No. 6,904,557 describes a decoding of the received signal over a frame to determine a cumulative metric, which is then compared with a threshold. U.S. Pat. No. 7,616,712 describes Cyclic Redundancy Code (CRC) checking, whereby a received burst is classified as a normal burst or not based on a preliminary classification and the validity of CRC. Several other patents and patent application publications describe other techniques, including: US Patent Application Publication 2004/0095918; U.S. Pat. No. 6,725,054; U.S. Pat. No. 7,782,820; U.S. Pat. No. 5,936,979; U.S. Pat. No. 6,587,447; U.S. Pat. No. 6,038,238; U.S. Pat. No. 7,437,172; and U.S. Pat. No. 6,370,392.

All of the methods described in these references suffer from one or more issues, however. For instance, many of these methods are based on a metric that characterizes frame quality. To use these methods, the receiver has to receive all the bursts of that frame/block, then trigger the decoder, and then compute the frame quality based on one or more of several metrics, and then compare the results with a threshold. Some methods are also based on CRC checking. These techniques assume that if a frame is a DTX frame, then it will show up as a bad quality frame, or the CRC will fail, etc. But these techniques have several issues. First, the receiver has to receive all four bursts of the frame—only then can it decode and estimate block or frame quality. This leads to a significant time delay in detection. Further, unnecessary power and processing resources will be consumed due to the unnecessary reception and processing (including demodulation and block decoding) of all bursts of the invalid frame/block.

Other techniques are based on a bit-energy-to-noise ratio (Eb/N0) computation. This approach also has several issues. Again, these approaches may involve a delay in detection, as these techniques generally take all bursts of the frame and include decoding of the block. Further, techniques based only on Eb/N0 are not very reliable, yielding excessive false detections and/or missed detections. Methods based on received power measurements have similar issues.

DTX detection is complicated by the introduction of VAMOS. Previous DTX-detection techniques are not likely to be sufficient in VAMOS scenarios. In addition to the problems discussed above, reliable DTX detection becomes much more complicated when two orthogonal users (sub-channel-1 and 2) are dynamically going in and out of DTX mode and when the respective modulation is changing to and from AQPSK (two users active), GMSK (one user active), or a noise-like signal (no user active). In this scenario, the MS has to quickly detect that a DTX scenario has happened and respond accordingly.

For example, consider that MS1 and MS2 are two mobile stations paired for VAMOS. Further assume that MS1 is allocated more power than MS2. The network sets this power imbalance by using the 'SCPIR' value. So, the 'SCPIR' for MS1 is +ve. Now, in the paired condition, the modulation type is AQPSK, so MS1's receiver will detect the 'SCPIR' value as positive. (Generally, the MS employs an 'alpha' estimator to detect the 'alpha' value applied to the AQPSK signal. One technique for detecting a SCPIR value is described in US Patent Application Publication 2012/0244817, the entire contents of which are incorporated herein.) If the detected SCPIR is positive, then MS1 processes the received signal as is, e.g., using Single Antenna Interference Cancellation and/or other advanced receiver techniques, but generally without subtracting MS2's signal, i.e., the other sub-channel's data. MS2, on the other hand, will detect the 'SCPIR' as −ve, and will generally use one or more advanced receiver techniques, such as Successive Interference Cancellation (SIC) and/or joint detection (JD) to process and decode the weaker signal targeted to MS2.

In this scenario, if one of the mobile stations goes to DTX mode, then the modulation will switch from AQPSK to GMSK. The SCPIR value will also change. If earlier it was −ve, then it will go to +ve. This is what MS2 will perceive if MS1 goes to DTX mode. On the other hand, if MS2 goes to DTX, then MS1, which earlier observed a SCPIR value of +ve, will now observe an even more positive SCPIR.

As a result of these complexities, DTX detection based on SNR, Eb/No, or received signal power will not work in the VAMOS scenario. Accordingly, improved techniques are needed.

SUMMARY

Several techniques are disclosed for detecting the presence of a known sequence in a series of received signal samples that may or may not include a burst containing the sequence. According to several of these techniques, a most likely location for the sequence within the received samples is identified. At least some of the samples from that location are then demodulated, to obtain bit estimates (e.g., hard bits, soft bits, or sign bits) corresponding to at least a portion of the expected sequence. The bit estimates can then be compared to the expected pattern (e.g., the expected TSC sequence) to determine whether the expected sequence is present. A sufficient match, e.g., at least a threshold number of matching bits, indicates that the expected sequence is present. In the GSM case, this match indicates that a valid Normal Burst targeted to the receiver has been detected. Otherwise, the receiver knows that DTX mode applies to the current frame. As detailed further below, this approach provides more reliable detection of DTX, and is especially suitable for use in a VAMOs scenario.

The following description details several embodiments of the disclosed techniques, including methods suitable for implementation by a wireless receiver, as well as wireless receiver apparatus adapted to carry out one or more of these techniques.

An example method for detecting DTX is suitable for implementation in a wireless receiver, given a first sequence of bits that is known by the wireless receiver to be included in transmission bursts targeted to the first wireless receiver and given a series of received signal samples corresponding to an expected transmission burst for the wireless receiver. The example method begins with estimating a channel response and a location for the first sequence within the series, the location for the first sequence indicating a subset of the received signal samples in the series. A plurality of bit estimates are generated from the subset of received signal samples, based on the estimated channel response, and the bit estimates are compared to bits in the first sequence of bits. The wireless receiver then determines whether a valid burst for the wireless receiver is present, based on said comparing.

In some embodiments, generating the plurality of bit estimates from the subset of received signal samples comprises demodulating only the subset of received signal samples, to obtain a series of demodulated soft bits, and obtaining the bit estimates for said comparing by converting the soft bits to hard bits. One or more soft bits at each end of the series of demodulated soft bits may be discarded before converting the remaining soft bits to hard bits, in some of these embodiments.

In other embodiments, generating the plurality of bit estimates from the subset of received signal samples comprises copying the subset of received signal samples to a first position in the series of received signal samples and copying the subset of received signal samples to a second position in the series of received signal samples, where the first and second positions are before and after the location for the first sequence, respectively. Received signal samples in the first and second positions in the series are then demodulated, to obtain the bit estimates for comparing.

The techniques disclosed herein, including the methods summarized above, may be used in both VAMOS and non-VAMOS scenarios. In a VAMOS scenario, for example, any of the example methods summarized above may further include, given a second sequence of bits that is known by the first wireless receiver to be included in transmission bursts targeted to a second wireless receiver in the event that orthogonal transmission bursts are simultaneously transmitted to the first and second wireless receivers, estimating a second channel response and a location for the second sequence within the series of received signal samples, the location for the second sequence indicating a second subset of the received signal samples in the series. A plurality of second bit estimates are then generated from the second subset of received signal samples, based on the second estimated channel response. These second bit estimates are compared to bits in the second sequence of bits, and the wireless receiver determines whether a burst for the second wireless receiver is present, based on said comparing of the second bit estimates to bits in the second sequence of bits.

This technique, when used for detecting the DTX status of paired receiver, may be further used to improve power imbalance estimation. Thus, for example, the method summarized above may further comprise, in response to determining that bursts for both the first and second wireless receivers are present, estimating a ratio of received powers for the bursts for the first and second wireless receivers. The technique may still further be used to improve demodulation performance in the VAMOS scenario. Accordingly, for example, the method may further comprise, in response to determining that bursts for both the first and second wireless receivers are present, demodulating first information bits targeted to the second wireless receiver, from the received signal samples, and generating reduced-interference signal samples by subtracting an estimated interference signal from the received signal samples. The estimated interference signal is based on the demodulated first information bits, i.e., the information targeted to the second wireless receiver. Second information bits, targeted to the first wireless receiver, are then demodulated from the reduced-interference signal samples.

Still other embodiments detailed herein include wireless receiver apparatus adapted to carry out one or more of the methods summarized above and/or detailed below. An example embodiment is a wireless receiver that comprises a receiver circuit adapted to receive transmission bursts in a wireless communications network and to produce received signal samples corresponding to the transmission bursts, and a processing circuit adapted to control the receiver circuit, to process the received signal samples. The processing circuit is further adapted, given a first sequence of bits that is known by the wireless receiver to be included in transmission bursts targeted to the wireless receiver and given a series of received signal samples corresponding to an expected transmission burst for the wireless receiver, to estimate a channel response and a location for the first sequence within the series, the location for the first sequence indicating a subset of the received signal samples in the series, and to generate a plurality of bit estimates from the subset of received signal samples, based on the estimated channel response. The processing circuit is further adapted to compare the bit estimates to bits in the first sequence of bits, and to determine whether a valid burst for the wireless receiver is present, based on said comparing.

Of course, the techniques, systems, and apparatus described herein are not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 15A and 15B illustrate an example listing of code for carrying out one example of the presently disclosed techniques.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
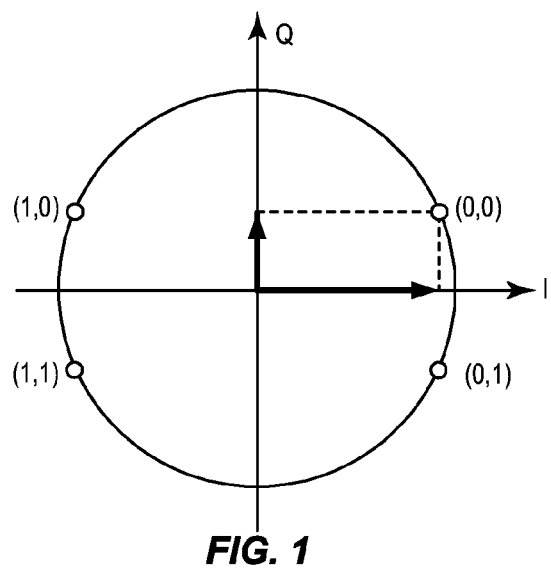
FIG. 1 illustrates an example APQSK constellation diagram.
Figure 2:
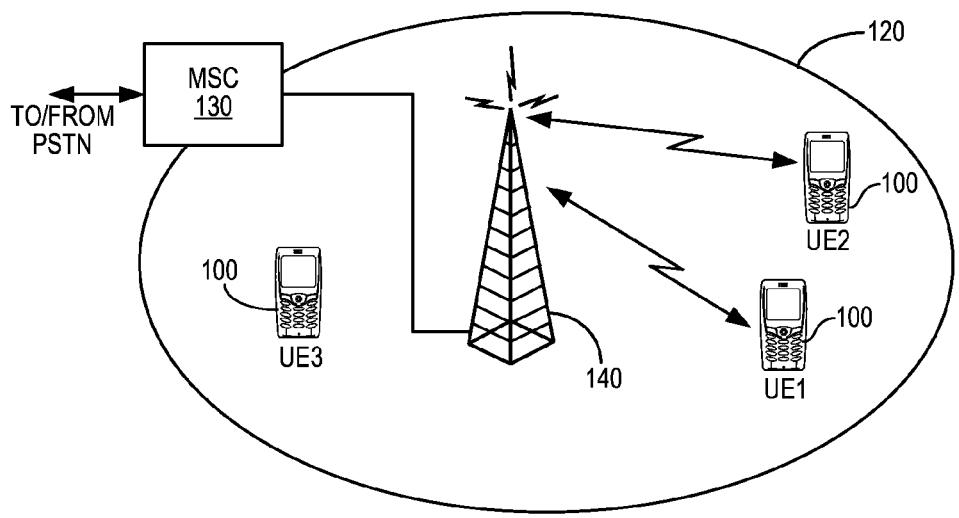
FIG. 2 illustrates an exemplary mobile communication network for providing wireless communication services.

Referring now to the drawings, FIG. 2 illustrates an exemplary mobile communication network for providing wireless communication services to mobile terminals 100. Three mobile terminals 100, which are referred to as "user equipment," "UEs," "mobile stations," or "MS's," in 3GPP and GSM terminology, are shown in FIG. 2. The mobile terminals 100 may comprise, for example, cellular telephones, personal digital assistants, smart phones, laptop computers, handheld computers, or other devices with wireless communication capabilities. It should be noted that the terms "mobile terminal" or "mobile station," as used herein, refer to terminals operating in a mobile communication network and do not necessarily imply that the terminals themselves are mobile or moveable. Thus, the terms may refer to terminals that are installed in fixed configurations, such as in certain machine-to-machine applications, as well as to portable devices, devices installed in motor vehicles, etc.

The mobile communication network comprises a plurality of geographic cell areas or sectors 120. Each geographic cell area or sector 120 is served by a base station 140, which is referred to in a GSM context as a BSS (base station subsystem) or in the UTRAN context as a Node B. One base station 140 may provide service in multiple geographic cell areas or sectors 120. The mobile terminals 100 receive signals from base station 140 on one or more downlink (DL) channels, and transmit signals to the base station 140 on one or more uplink (UL) channels.

In a GSM system, base station 140 is connected to a Mobile Switching Center (MSC) 130, which handles mobility (handover) functions, sets up and releases end-to-end connections, and routes voice traffic to and from the Public Switched Telephone Network (PSTN). In a UTRAN system, base station 140 would be connected to a Radio Network Controller (RNC), which controls one or several base stations, performing radio resource management and mobility management functions.

For illustrative purposes, several embodiments of the presently disclosed invention will be described in the context of a GSM system. Those skilled in the art will appreciate, however, that this is done for convenience and that the disclosed techniques are more generally applicable to other wireless communication systems.

As part of the standardization of the VAMOS functionality discussed above, a test case condition has been added to the GSM EDGE Radio Access Network (GERAN) specifications, to ensure that VAMOS works in DTX scenarios. More particularly, the revised tests ensure that MS's work in VAMOS paired/unpaired mode and DTX/non-DTX mode. From the GERAN specification for "Radio Transmission and Reception, 3GPP TS 45.005, v. 11.2.0 (November 2012):

Q.6 VAMOS DTX Scenario in Downlink

The purpose of this test case is to verify the VAMOS II mobile receiver performance when the paired VAMOS subchannel user goes into and comes out of DTX.

The modulation of the downlink VAMOS signal shall be switched between AQPSK (with −10 dB SCPIR) and GMSK according to the following:

$$p(\text{Downlink Modulation}) = \begin{cases} 0.4, & \text{for Downlink Modulation being } GMSK \\ 0.6, & \text{for Downlink Modulation being } AQPSK \end{cases}$$

The power of the GMSK burst in the downlink in this test case shall be 10.5 dB lower than the power of the AQPSK burst. The average input signal level over all the bursts at the reference performance for the VAMOS II MS shall be as per the table 1u. The reference performance according to section 6.2.1a shall be applicable for this test case.

So, reliable, quick DTX detection and reliable detection of VAMOS paired and unpaired conditions become very necessary, but difficult. Disclosed herein are new techniques that address these issues. Embodiments of these techniques may be used to detect a DTX condition very early, e.g., after the reception of the first burst of the block itself. These techniques may be used in normal scenarios, as well as in VAMOS scenarios. In both cases, the early detection will prevent the reception and processing of the remaining three bursts in a block, and also prevent unnecessary decoding of the whole block. The techniques may be used to detect the DTX mode in a VAMOS scenario, for either or both users in a paired VAMOS scenario. These techniques may be used to dynamically determine whether the MS is in paired or unpaired VAMOS mode, and can be used to ensure a reliable estimation of the alpha value even when both the users are switching between normal and DTX modes.

In both non-VAMOS and VAMOS scenarios, the base station transmits speech channel data (via the Traffic Channel, TCH, in GSM) and other control channels, such as the Slow Associated Control Channel (SACCH) and Fast Associated Control Channel (FACCH), using the "Normal Burst" (NB). The GSM specification 3GPP TS 45.002 specifies the Normal Burst structure, which is illustrated in FIG. 3.

Figure 3:
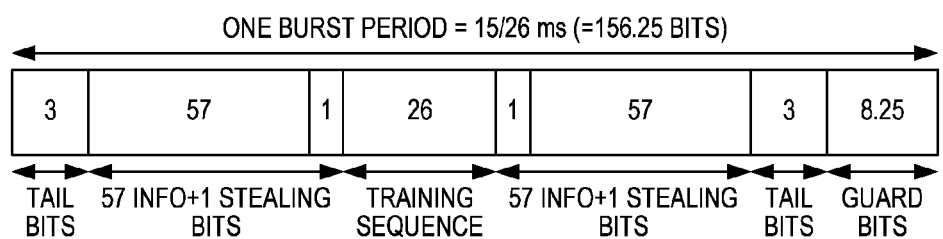
FIG. 3 illustrates the Normal Burst structure in GSM network.

As shown in FIG. 3, each normal burst includes, from left to right, three tail bits, 57 bits of encoded/interleaved/ciphered data, one stealing bit, a 26-bit Training Sequence Code (TSC), another stealing bit, another 57 bits of encoded/interleaved/ciphered data, three tail bits, and a guard bit interval with a length of 8.25 bits. Every GSM base station has a BCC (base station code) number, which is mapped to one of eight unique Training Sequence Codes (TSCs). The base station uses this TSC in each NB transmission. The TSC set is defined in 3GPP TS 45.002.

The TSC is known to the MS receiving the normal burst, and is used by the MS for channel estimation purposes. While various techniques for channel estimation using those known TSC bits may be used, the input to a MS's channel estimation unit is the TSC number and the received [I,Q] samples taken from the received signal over the burst interval. The channel estimation unit uses this known TSC bit sequence and then estimates a channel response h and identifies the start position of the TSC sequence in the received [I,Q] samples r[n].

The positions of the other fields can be easily derived from the start position of the TSC. Thus, for example, if the start position of the TSC sequence detected in the received burst r[n] is x, then the burst boundary starts in the [I,Q] sample buffer at a bit location x−1−57−3=x−61. The first field of encoded data begins three bit locations (three [I,Q] samples) later.

In a non-DTX scenario, the transmitter sends a normal burst (NB) structure with the proper TSC number embedded inside the burst. In a DTX scenario, the transmitter will not send anything. If the receiver opens the RF window during this DTX interval and listens to the transmitted signal, there will be no expected training sequence data present in the received burst. In several embodiments of the presently disclosed techniques, a DTX scenario is detected, based on the presence or absence of a known expected TSC pattern inside a received burst data. In the GSM context, this procedure is followed only for normal bursts transmitted on carrier frequencies other than the broadcast frequency, since DTX is not used on the broadcast frequency.

Several techniques may be used to detect the presence of a known sequence, such as the TSC, in a received burst. One approach is a correlation-based method, where the presence of a particular sequence in the received burst is detected by correlating the received burst with a modulated version of the known sequence. In the GSM context, for example, the TSC sequence is known a priori, since the MS knows the BCC number for its serving base station and can identify the correct TSC using the same mapping rule used by the base station. The MS can then modulate the known TSC, using GSMSK modulation, to obtain a modulated data sequence. The resulting modulated data sequence is then cross-correlated against the received, de-rotated signal I/Q samples for the burst. Note that the modulated TSC data can be pre-stored, e.g., from a previous non-DTX TCH burst's or any normal burst's reception from the same base station.

A key advantage of this cross-correlation approach is its simplicity. However, this method is not sufficiently reliable, since fluctuations in the received power will cause the correlation amplitudes to change, making it difficult to establish an optimum correlation threshold value to reliably trigger a detection of the known sequence. Furthermore, this approach will not work in VAMOS scenarios, as the modulated TSC for each of two users is overlapped.

Another approach is to estimate the channel impulse response power, using the TSC, and then compare the estimated channel impulse response power to a predetermined threshold. As noted above, channel estimation can be performed on the assumption that a normal burst, including the TSC, has been received. If a normal burst has not actually been received, the resulting channel estimate will be noisy, and should generally be of low power. Accordingly, the power of the estimated channel impulse response is an indicator of whether the TSC (and hence a normal burst) is present. However, this approach, while simple, is not very reliable.

A better approach to detect the presence of a known sequence in a series of received signal samples that may or may not include a burst containing the sequence is to identify the most likely location for the sequence, within the received samples, and to demodulate at least some of the samples from that location, to obtain bit estimates (e.g., hard bits, soft bits, or sign bits) corresponding to at least a portion of the expected sequence. The bit estimates can then be compared to the expected pattern (e.g., the expected TSC sequence) to determine whether the expected sequence is present. A sufficient match, e.g., at least a threshold number of matching bits, indicates that the expected sequence is present. In the GSM case, this match indicates that a valid Normal Burst targeted to the receiver has been detected. Otherwise, the receiver knows that DTX mode applies to the current frame. As detailed further below, this approach provides more reliable detection of DTX, and is especially suitable for use in a VAMOs scenario.

The demodulation of the received signal samples from the identified location in the received burst data can be done in two different ways, detailed below. The first approach is conceptually the simplest, but the second approach may be easier to implement in an existing receiver architecture, in some cases. Note that while the discussion below details these approaches as applied to detecting a TSC in a GSM Normal Burst, the techniques are more broadly applicable to other signals and other known sequences.

Figure 4:
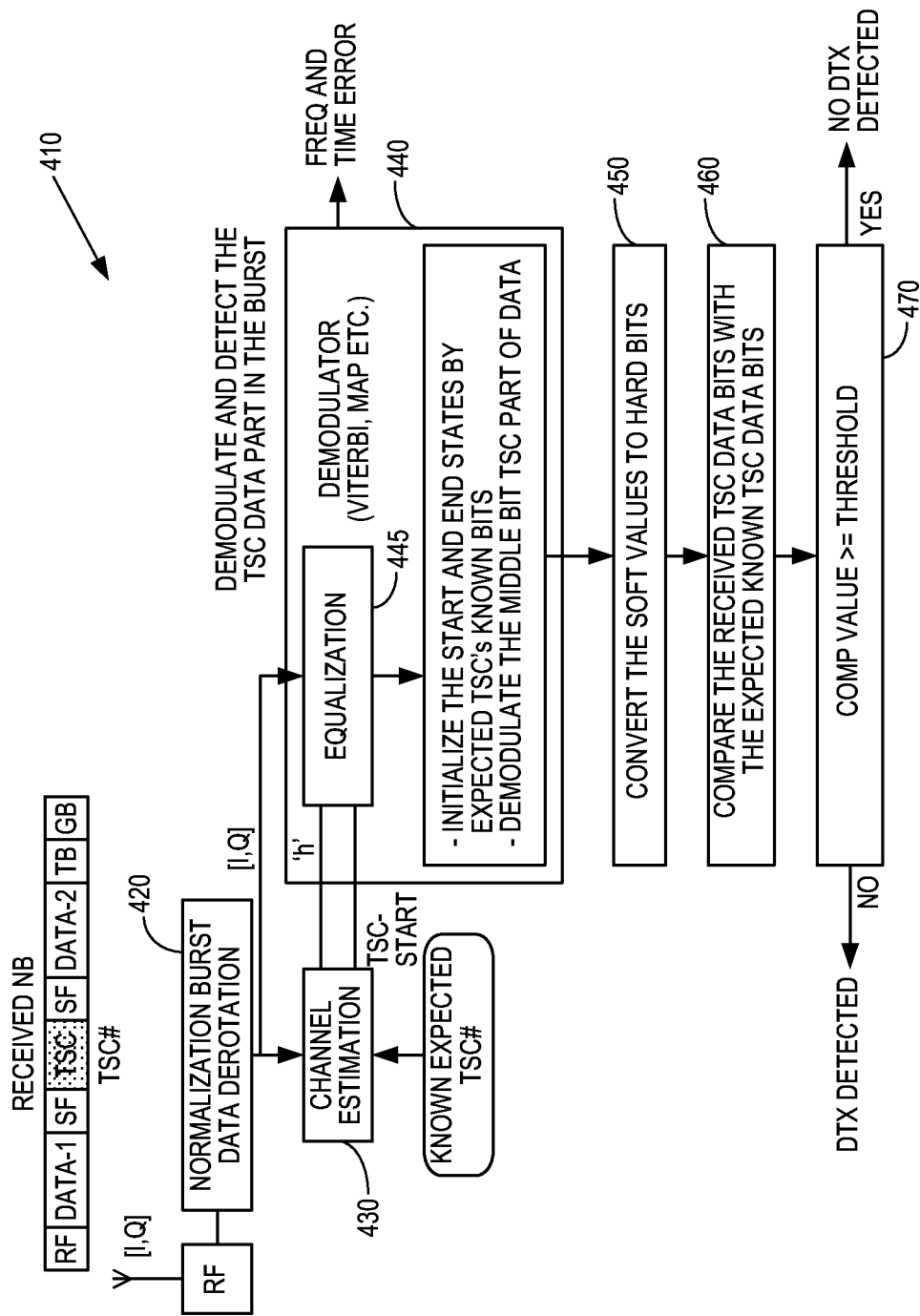
FIG. 4 illustrates an example process for DTX detection in a wireless receiver.

According to the first approach, only the part of the received signal corresponding to the expected TSC location is demodulated. Note that a typical demodulator may be based on a trellis demodulation algorithm—in this case there is no tail data to initialize or finalize the trellis. However, this is not a significant problem, as a slight modification of the usual trellis-based demodulation algorithm will work. Steps to be followed in an example embodiment of this approach are detailed below. Several features of the process described above are shown in FIG. 4.

First, a receiver circuit 410 generates received I/Q samples from the received burst. These received I/Q samples are normalized and de-rotated, according to conventional procedures, in a normalization and de-rotation unit 420. These normalized and de-rotated samples are passed to a channel estimation unit 430. The channel estimation unit 430 performs a channel estimation and produces the channel impulse response by taking as input the known TSC bits and the input I/Q samples. It also identifies the most likely location of the TSC sequence in the burst, thus producing an index to the TSC start position or to the burst start position (TSCstart). Of course, if the received burst does not contain TSC pattern at all, then the estimated channel response will be very noisy and of poor quality. However, the channel estimation unit may still produce an index to a most likely starting point for the (non-existent) TSC sequence in the noisy sequence of received data samples.

The channel impulse response h produced by the channel estimation unit 430 is passed to a demodulation/equalizer unit 440, along with the normalized and de-rotated signal samples, for equalization (in equalization sub-unit 445) and demodulation. Here, only the samples corresponding to the TSC part of the burst need to be demodulated. To implement in an existing receiver design, this may require a modification of the existing demodulator/equalizer unit, which may be designed specifically to handle an entire burst at once. In any case, the demodulator/equalized demodulates the part of the received signal corresponding to the TSC portion of the burst, which can be found by using the sync position (TSCstart).

As a demodulation algorithm, any known algorithm like—Viterbi or MAP can be used. This can be suitably modified to take into account that the start and end states are unknown. For example, the known start and end states can be initialized to the first five bits and last five bits of the known TSC sequence, respectively. The portion of the received sample sequence corresponding to the middle portion of the expected TSC sequence (e.g., the remaining 16 bits) are then demodulated to obtain corresponding bit estimates.

A typical demodulator will produce soft bit estimates, which can be converted to hard bits, as shown at 450, according to a simple conversion:
+ve soft values=>convert to 0 bit
−ve soft values=>convert to 1 bit.
The resulting hard bits are then compared to the expected TSC bits (which are pre-known), as shown at 460.

One comparison approach is to simply count the number of matches between the expected bit values and the hard bit estimates obtained according to the above approach. If the comparison value exceeds a threshold (comp>Threshold) then it is confirmed that this is not a DTX, else it is a DTX scenario detected. This is shown at block 470 in FIG. 4. Given 16 bit estimates corresponding to 16 bits of the TSC, one example of a threshold is 12. Other threshold values might be used, in some embodiments. In some cases, the threshold value might be adjusted from time to time, e.g., based on signal conditions. Also note that other comparison approaches might be used, in some embodiments, such as comparison processes that account for the magnitude of the soft bit estimates produced by the demodulator.)

In a DTX scenario, the burst data will be noise samples. So, the estimated channel response will be noisy and the channel estimate h will be very bad. So, the burst data equalization will be poor. Once the equalized samples are demodulated, the generated soft bit values will be lower (lower in confidence value), and the demodulated TSC soft bits will be random. When these converted soft values are compared with the expected TSC data pattern, there will not be a good match (i.e., the number of matching bits is not likely to greatly exceed the number expected with a random sequence of bits), and the comparison value will be below threshold.

Another approach to demodulating the received samples corresponding to the expected TSC sequence is detailed below. In this approach, the I/Q samples in the portion of the received burst corresponding to the likely position of the TSC are copied to the portions of the received sample sequence that would normally be carrying encoded data for the mobile station, on both sides of the TSC location. Of course, this is done after identifying the most likely position of the TSC within the received sample sequence corresponding to the received burst. These portions of the sample sequence, now containing copied data from the TSC portion of the burst, are then demodulated, and the resulting bit estimates are compared to the expected TSC sequence.

Figure 5:
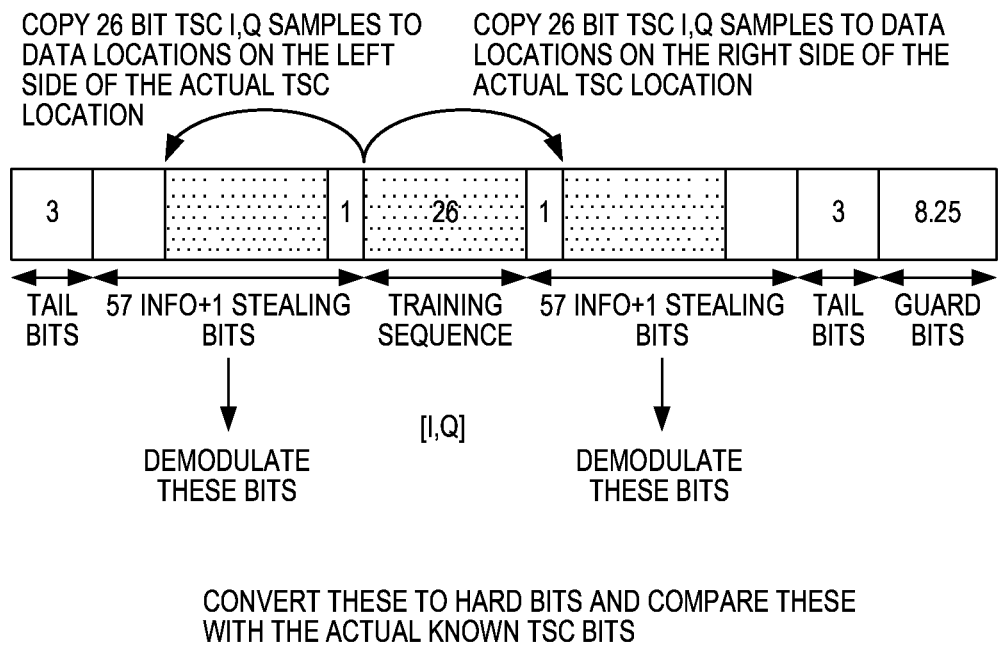
FIG. 5 illustrates an example approach to generating bit estimates for comparing to a known sequence of bits.

FIG. 5 illustrates this approach, as applied to a GSM Normal Burst. As shown in the figure, received signal samples from the TSC portion of the burst are copied into the portions of the burst that would normally carry 57 information bits, on each side of the burst. The copied sample data is then demodulated. It will be appreciated that one advantage of this approach is that it may require fewer modifications to existing receiver designs, as a demodulator designed to output demodulated information bits from a GSM normal burst can be used.

Figure 6:
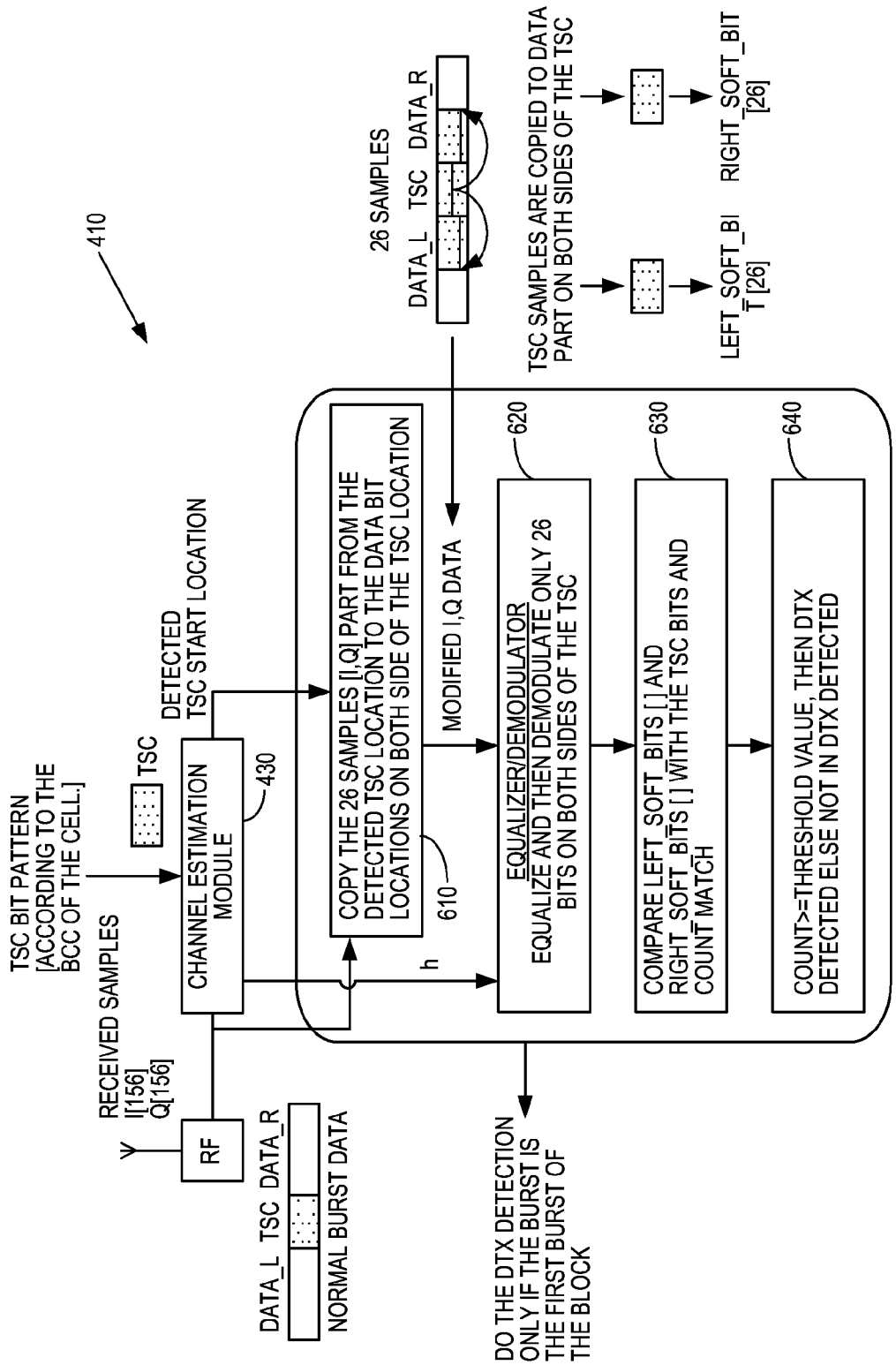
FIG. 6 illustrates another example process for DTX detection in a wireless receiver.

An example embodiment of this approach is detailed below. Features of this example approach are illustrated in FIG. 6.

Once again, a receiver circuit 410 generates received I/Q samples from the received burst. These received I/Q samples are normalized and de-rotated, according to conventional procedures, in a normalization and de-rotation unit (not shown in FIG. 6). These normalized and de-rotated samples are passed to a channel estimation unit 430. The channel estimation unit 430 performs a channel estimation and produces the channel impulse response by taking as input the known TSC bits and the input I/Q samples. It also identifies the most likely location of the TSC sequence in the burst, thus producing an index to the TSC start position or to the burst start position (TSCstart). Of course, if the received burst does not contain TSC pattern at all, then the estimated channel response will be very noisy and of poor quality. However, the channel estimation unit may still produce an index to a most likely starting point for the (non-existent) TSC sequence in the noisy sequence of received data samples. The channel estimation unit finds the TSC start position, e.g., x. (Ideally, the TSC start position is at 58+3=61 samples from the burst start location for a GSM normal burst). From the TSC start position, a burst start position can be calculated, e.g., x−61.

Next, as shown at block 610, 26 I/Q samples are copied from location x to location x−27, i.e. to the information-carrying portion on the left side of the TSC location. The same I/Q samples are also copied from x to the x+27 location, i.e., to the information-carrying portion on the right side of the TSC location. This means that some of the data samples from the information-carrying part of the normal burst are replaced by received samples from the portion that is expected to be carrying the TSC. Note that this example assumes that there is a single I/Q sample in the received sample buffer per received data bit. The outlined procedure can be easily adjusted to accommodate other scenarios. For instance, if there are two I/Q samples per bit, then 56 samples are copied to positions x−54 and x+54.

The burst's modified I/Q samples are then fed to the equalizer/demodulator, as shown at block 620. The I/Q data is equalized according to the estimated channel response h produced by the channel estimation unit 430 and then demodulated. To reduce the processing overhead, only 26 locations on both sides of the TSC are demodulated, in some embodiments, which means that soft bits are produced only for 26 bits on both sides of the TSC part. Generally, a MS uses trellis based demodulator, so here the trellis is truncated after the 26 soft bits on both sides. Note that during demodulation, the trellis generally starts from the middle of the known TSC section and works outward. Since the bits of the TSC are assumed to be known, the trellis is initiated with these bits and then the trellis demodulator begins demodulating the unknown bits in the data part.

Once the copied I/Q samples on both the sides of the TSC (left and right) are demodulated and corresponding soft bits are produced, then the resulting 26 soft bits on each side are individually compared with the expected TSC sequence, as shown at block 630. In some embodiments, only the soft bit's sign value is considered, and converted to 1 or 0. Thus, for example, if soft_bits are +ve (e.g. >=0) then a value of '0' is used, otherwise a '1' is used.

In some embodiments, the first and last 5 bits or so of the demodulated soft bits, for each side, are not considered in the comparison, as there could be some phase discontinuity in the TSC and copied TSC pattern data. In these embodiments, then, only 16 bits middle part on left side and right side demodulated data are used for the comparison. Of course, a different number of soft bits could be disregarded, in other embodiments.

The matched bit count between the demodulated soft bits and their expected values from the TSC is compared to a threshold value, as shown at block 640. If the match count exceeds the threshold value, then it will be considered that the burst is a valid Normal Burst and contains the expected TSC data. For example, the threshold might be sent to 23, in the event that 16 bit estimates from each side are compared to the TSC sequence, in which case a 25% mismatch/75% match condition (or better) indicates a valid Normal Burst.

In a non-DTX condition, the match count will be very high (ideally 32, in the previous example), since in a non-DTX condition the Normal Burst is transmitted. So, the demodulated TSC and known TSC will match. In DTX mode, on the other hand, the NB is not transmitted, so the TSC will not be present in the received burst. This means that the channel estimation will not be proper, so the channel estimate h will be very noisy. As a noisy signal will be received and demodulated in this situation, random soft bits will be generated, which will not match well with the actual TSC pattern. So, the count match value will fall below the threshold value, indicating a DTX condition. Note that a low value of the estimated power of the channel estimate h can be used to indicate a bad channel condition as well as a DTX condition, e.g., by comparing the channel estimate power to a corresponding threshold. But, that will not provide detection as reliably as the procedure outlined above.

The procedures detailed above are executed only during reception of the first burst in a block, in some embodiments. Once it is detected that the first burst does not contain the normal bursts, then that indicates the DTX scenario. Thus, the reception and demodulation of the remaining bursts in the block can be skipped. Also, the decoding of the block/frame can be skipped. The early detection of the DTX enabled by these procedures can thus save power and processing in the receiver.

As noted above, in a GSM system the procedures described above can be used when the received carrier frequency is not the broadcast channel frequency. The broadcast frequency channel is always transmitted, even in the unused slots of that frequency, because mobile stations in the cell use the broadcast channel frequency to measure received signal strength. During DTX periods, the broadcast channel transmits a so-called Dummy Burst. A Dummy Burst might contain the same TSC as used in a Normal Burst transmission, but it can instead contain a different TSC or even random data. That would lead to problems if the above DTX-detection techniques were applied. Accordingly, in some embodiments the DTX-detection processes described above are applied as follows. If the received channel's frequency is not the broadcast frequency, then just after the reception of the first burst, the DTX checking described above is performed. If DTX is detected, then further reception and decoding of that block, may be skipped. If frequency hopping (FH) is enabled and the first burst transmission frequency is broadcast frequency, then DTX checking is not performed at that burst. Rather, the DTX checking is performed in the next burst as the frequency will change from the broadcast frequency to some other frequency, in a frequency-hopping scenario.

Figure 7:
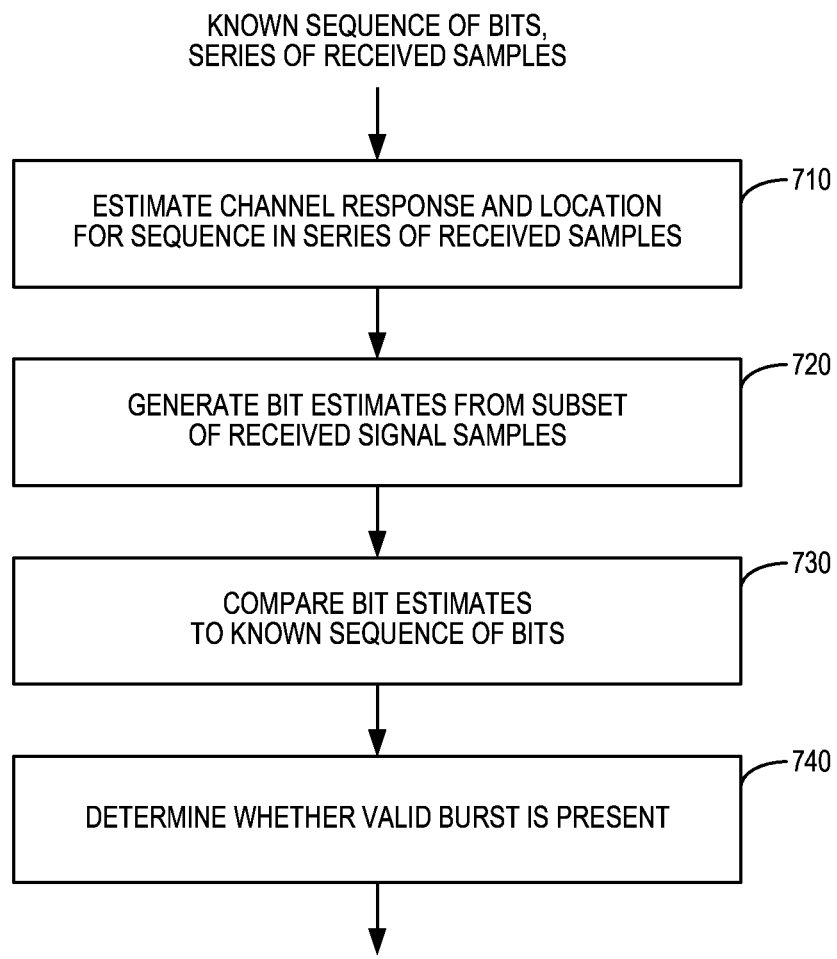
FIG. 7 is a process flow diagram illustrating an example method for DTX detection.

Given the above detailed procedures, it will be appreciated that FIG. 7 illustrates a generalized method for detecting DTX in a wireless receiver. The illustrated technique encompasses both of the procedures described above and variants thereof, including embodiments that are applied to systems other signal structures other than the GSM structures descried herein.

The illustrated procedure begins with the receiver having a sequence of bits that is known by the first wireless receiver to be included in transmission bursts targeted to the wireless receiver. In a GSM context this known sequence of bits may be a TSC used by the base station, but other embodiments of the illustrated technique may use a different known sequence. The receiver also has a series of received signal samples corresponding to an expected transmission burst for the first wireless receiver. As shown at block 710, the wireless receiver estimates a channel response and a location for the first sequence within the series of received samples, the location for the first sequence indicating a subset of the received signal samples in the series.

As shown at block 720, the receiver generates a plurality of bit estimates from the subset of received signal samples, based on the estimated channel response. Either of the demodulation procedures described above may be used to produce these bit estimates, for example. Further details of one approach will be discussed below, in connection with FIG. 8. Note that the bit estimates produced at this stage may be soft bits, sign bits, or hard bits.

As shown at block 730, the wireless receiver compares the bit estimates to bits in the known sequence of bits. The wireless receiver then determines whether a burst for the wireless receiver is present, based on said comparing, as shown at block 740.

In some embodiments, the comparing of the bit estimates to the first sequence of bits comprises comparing each bit estimate to a corresponding bit from the known sequence of bits and counting a number of matches between the bit estimates and corresponding bits in the known sequence of bits. The number of matches is then compared to a predetermined threshold to determine whether a burst is present. Thus, the wireless receiver may conclude that a burst is present if the number of matches is greater than a predetermined threshold, in some embodiments.

In some embodiments, the generating of the plurality of bit estimates from the subset of received signal samples comprises demodulating only the subset of received signal samples, to obtain a series of demodulated soft bits. The bit estimates for comparing to the known sequence of bits may be obtained, in some embodiments, by converting the soft bits to hard bits. In some embodiments, one or more soft bits at each end of the series of demodulated soft bits may be discarded, before converting the remaining soft bits to hard bits. In one example, the known sequence of bits is 26 bits in length, and 16 soft bits are converted to 16 hard bits, for comparing to corresponding bits in the known sequence.

Figure 8:
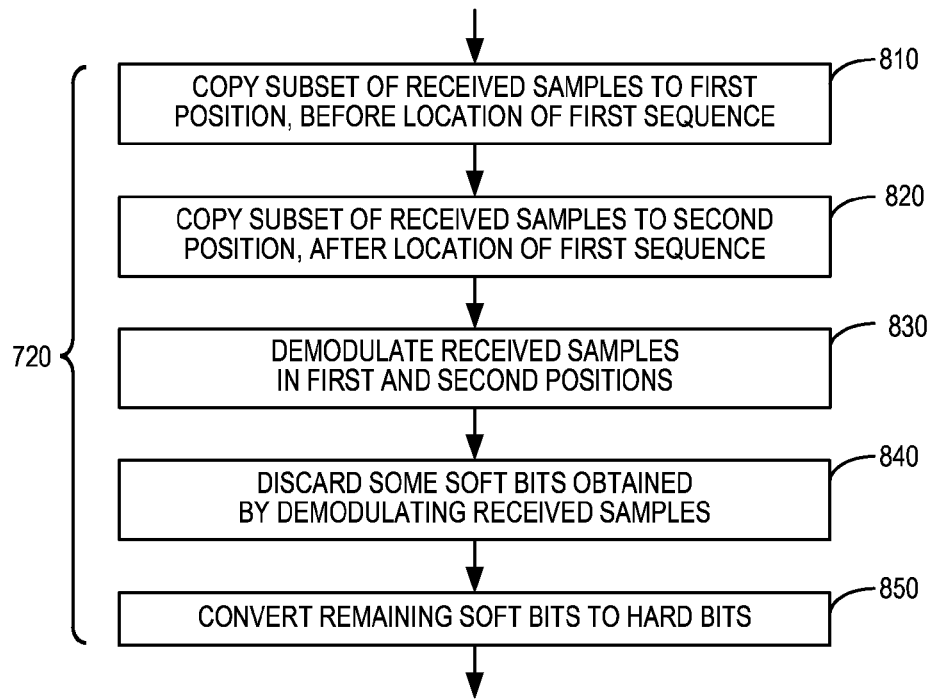
FIG. 8 is a process flow diagram illustrating another example method for DX detection.

Other embodiments of the approach may use a different approach to generate the plurality of bit estimates from the subset of received signal samples. One such approach, which encompasses the TSC-copying procedure detailed above, is illustrated in FIG. 8. Note that the illustrated operations shown in FIG. 8 correspond to block 720 of FIG. 7, in some embodiments.

The sub-procedure illustrated in FIG. 8 begins, as shown at blocks 810 and 820, with copying the subset of received signal samples to a first position in the series of received signal samples and copying the subset of received signal samples to a second position in the series of received signal samples. These first and second positions are before and after the location for the first sequence, respectively, and may correspond to positions that would normally be expected to carry encoded information bits for the wireless receiver, e.g., the information bit positions in a GSM Normal Burst.

As shown at block 830, the wireless receiver then demodulates the received signal samples in the first and second positions in the series, to obtain the bit estimates for comparing. This demodulating produces a first and second series of soft bits. As shown at block 840, one or more soft bits may be discarded at each end of the first and second series of demodulated soft bits, in some embodiments. The bit estimates for comparing to the know sequence of bits are then obtained by converting the remaining soft bits to hard bits, as shown at block 850. In one particular example, the known sequence of bits is 26 bits in length, and 16 soft bits from the first series and 16 soft bits from the second series are converted to hard bits for said comparing.

As suggested earlier, the DTX detection procedure detailed above may be used to save wireless receiver resources, by skipping channel decoding of one or more subsequent transmission bursts in response to determining that a burst is not present, i.e., in response to determining that a DTX condition is present. The techniques described above may be used in a receiver operating with a conventional GSM channel structure, in some embodiments. These techniques may also be used advantageously in a VAMOS scenario, as detailed below.

In a VAMOS scenario, a base station transmits Normal Bursts to paired mobile stations using two TSCs. One of these is the old TSC, obtained from the base station identify in the same manner discussed above. The other is a new TSC. The specifications for VAMOS specify eight new unique TSC sequences; each of these corresponds to one of the old ones.

Figure 9:
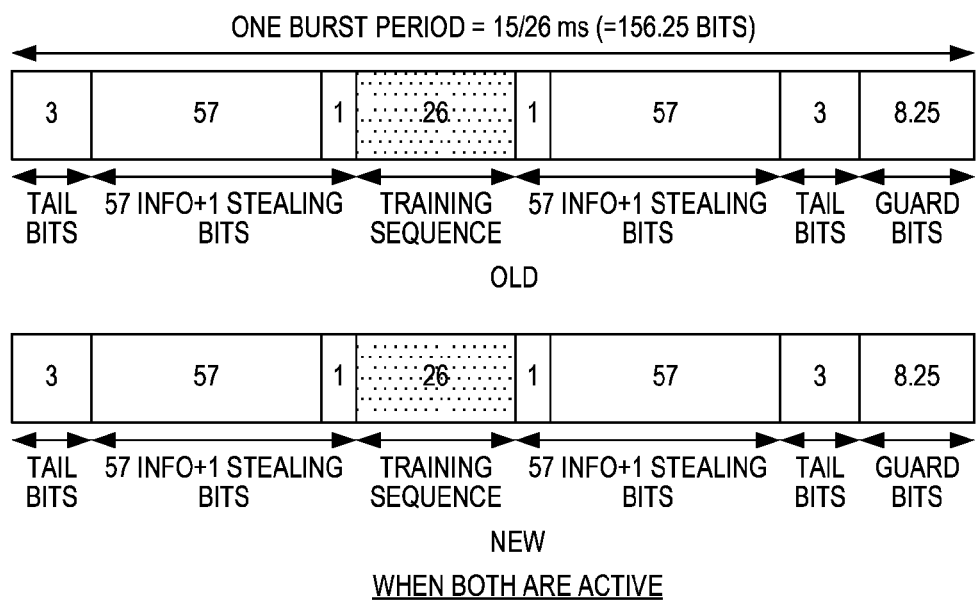
FIG. 9 illustrates the overlapping of two TSC signals in a VAMOS scenario.

The base station assigns its old TSC to one MS and the corresponding new TSC to the other paired MS. When two MSes are paired, then two TSC signals will be overlapped in the same frequency and time slot. This is shown in FIG. 9. This occurs in each Normal Burst that carries voice data for both mobile stations. As discussed above, the voice data for the two mobile stations is multiplexed onto the I and Q branches of the signal, which is modulated using an AQPSK modulation scheme.

Figure 10:
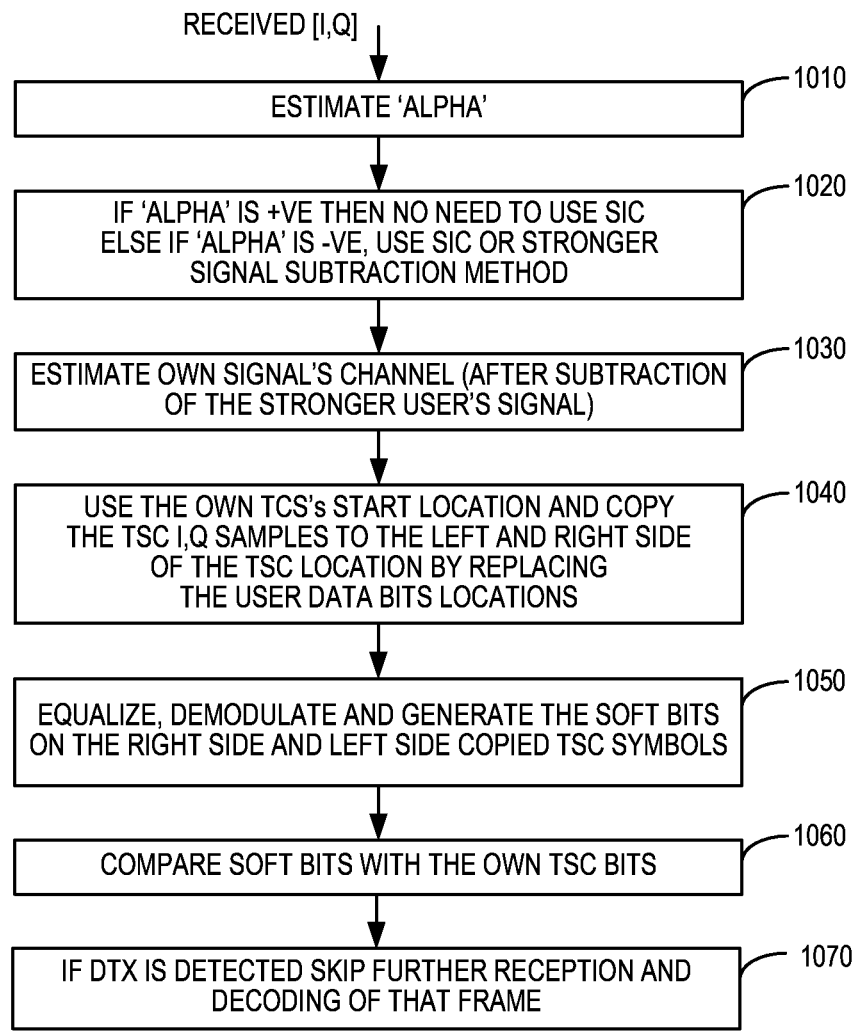
FIGS. 10 and 11 are process flow diagrams illustrating example methods for detecting DTX modes in VAMOS scenarios.

Now, when one MS goes to DTX mode, that MS's TSC will not be present in the received signal. Assume that are two mobile stations—MS1 and MS2, where MS1 uses TSC_old and MS2 uses TSC_new. Assume that the data for MS1 is transmitted with higher power than used for MS2's data. FIG. 10 illustrates an example procedure that might be carried out by MS2 in this situation.

Generally, MS2 will receive a series of I/Q samples corresponding to an expected burst, and will then estimate an alpha value, as shown at block 1010, to determine whether the SCPIR value is negative or not (block 1020). If it is, indicating that MS2's signal is weaker than MS1's, then MS2 will try to estimate MS1's stronger signal and subtract it from the received signal r(t), to obtain a reduced-interference version of the received signal. This is shown at block 1030. Given a channel response h, the resulting reduced-interference signal can be represented as $\{r(t)-h*s(MS1)\}$, where s(MS1) is the estimate of MS1's signal. MS2 can then perform the equalization and demodulation of the reduced-interference signal.

Before actual demodulation, however, MS2 can use the DTX-detection techniques described above to detect a DTX condition. For instance, as detailed above, MS2 copies the TSC I/Q samples to the portion of the interference-reduced sample set that is expected to carry information bits, as shown at block 1040. MS2 then demodulates the resulting samples, as shown at block 1050, and compares the resulting bit estimates to the TSC, as shown at block 1060. If the demodulated TSC data part matches with the known TSC pattern, e.g., having a match count above a predetermined threshold, then MS2 knows that it is not in a DTX condition. It can then skip further reception and decoding of the current frame, as indicated at block 1070. Note that this basic procedure applies to any type of VAMOS receiver, whether it uses joint demodulation (JD) or successive interference cancellation (SIC) techniques.

Note that the same general approach can be used to decide the other user's DTX status. In this case, however, the other TSC will be used for channel estimation as well as for the comparison after demodulation. In some embodiments, the DTX-detection technique is applied to both TSCs.

Figure 11:
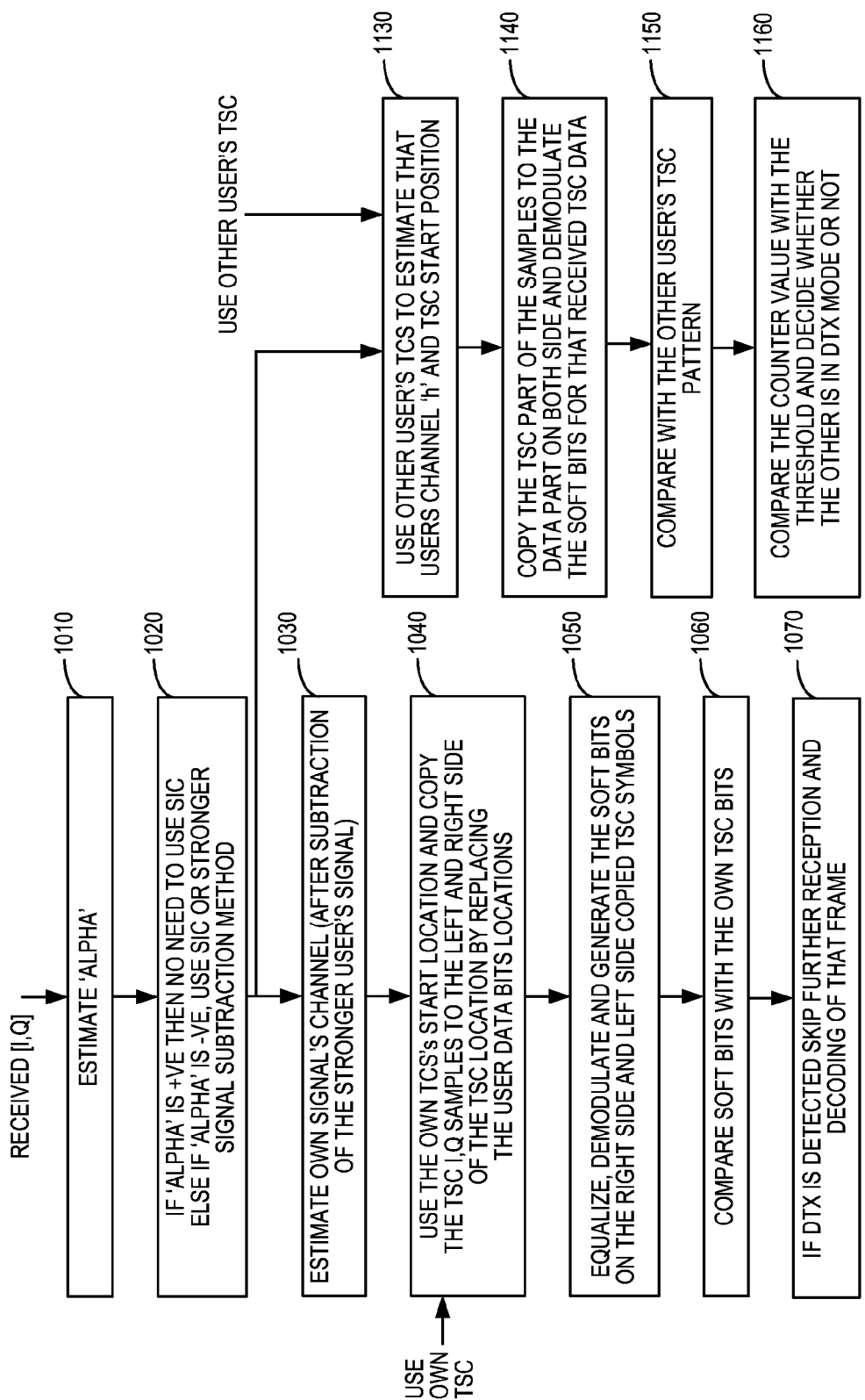

An example of this approach is shown in FIG. 11, which expands upon the procedure shown in FIG. 10. It can be seen that blocks 1130 and 1160 correspond directly to blocks 1030 and 1060, while block 1140 corresponds to blocks 1040 and 1050, but the operations described therein are carried out using the other user's TSC. As shown at block 1170, the MS can use the comparison results to determine whether the other MS is in DTX mode or not.

If both TSCs are present, then that signifies that both the users are active and are paired. That means neither is in DTX mode. If one TSC is present, then that MS is active and either a paired MS is in DTX or the active MS is unpaired. If no TSC is detected then both mobile stations are in DTX mode.

Figure 12:
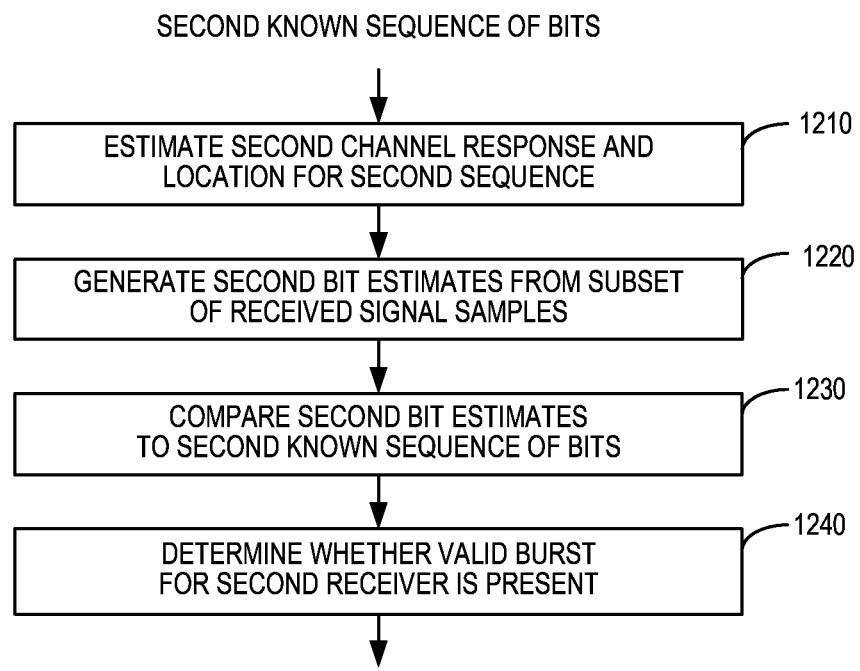
FIG. 12 is another process flow diagram illustrating an example method detecting DTX modes for two wireless receivers.

In view of the preceding discussion, it will be appreciated that the general DTX-detection techniques discussed above and illustrated in FIGS. 7 and 8 may be advantageously applied in a VAMOS scenario. FIG. 12 is a process flow diagram illustrating method steps that may be combined with the operations shown in FIGS. 7 and 8, in such a scenario. Here it is assumed that the wireless receiver carrying out the illustrated procedure is given a second sequence of bits that is known by the first wireless receiver to be included in transmission bursts targeted to a second wireless receiver in the event that orthogonal transmission bursts are simultaneously transmitted to the first and second wireless receivers, e.g., to paired VAMOS receivers. As shown at block 1210, the wireless receiver estimates a second channel response and a location for the second known sequence within the series of received signal samples, the location for the second sequence indicating a second subset of the received signal samples in the series.

As shown at block 1220, the wireless receiver generates a plurality of second bit estimates from the second subset of received signal samples, based on the second estimated channel response. The wireless receiver may use any of the demodulation approaches discussed earlier, for example, including the copy-and-demodulate techniques detailed above.

As shown at block 1230, the second bit estimates are compared to bits in the second sequence of bits. As indicated at block 1240, the wireless receiver determines whether a burst for the second wireless receiver is present based on this comparison.

In some embodiments, in response to determining that bursts for both the first and second wireless receivers are present, the wireless receiver estimates a ratio of received powers for the bursts for the first and second wireless receivers. This is shown at block 1250, which is outlined with a dashed line to indicate that this operation is not present in all embodiments. Conditioning this calculation on determining that neither receiver is in a DTX condition prevents the ratio calculation from being distorted by the absence of any real signal power for one or the other of the receivers.

As shown at block 1260, some embodiments employ a successive interference cancellation (SIC) approach to demodulating information bits targeted to the wireless receiver, after determining that bursts for both receivers are present. Again, conditioning the use of SIC on the presence of both signals makes sense, as there is no signal to cancel if the other receiver is in a DTX condition. This SIC demodulation is carried out, in some embodiments, by demodulating first information bits targeted to the second wireless receiver, from the received signal samples, generating reduced-interference signal samples by subtracting an estimated interference signal from the received signal samples, where the estimated interference signal is based on the demodulated first information bits, and demodulating second information bits targeted to the first wireless receiver, from the reduced-interference signal samples.

The procedures detailed above have been implemented and tested. Simulation code used to test these procedures is shown in FIGS. 15A and 15B. Execution of this simulation code in various simulated environments provided good results for all channel conditions, including the Static, RA250, TU50 FH/no FH, HT100, CCI, ACI, and DARP scenarios used in testing GSM implementations. For all the cases, the DTX mode detection was 100% for signal-to-noise ratios of 5 dB or above, using only the first burst of the block as described above.

Figure 13:
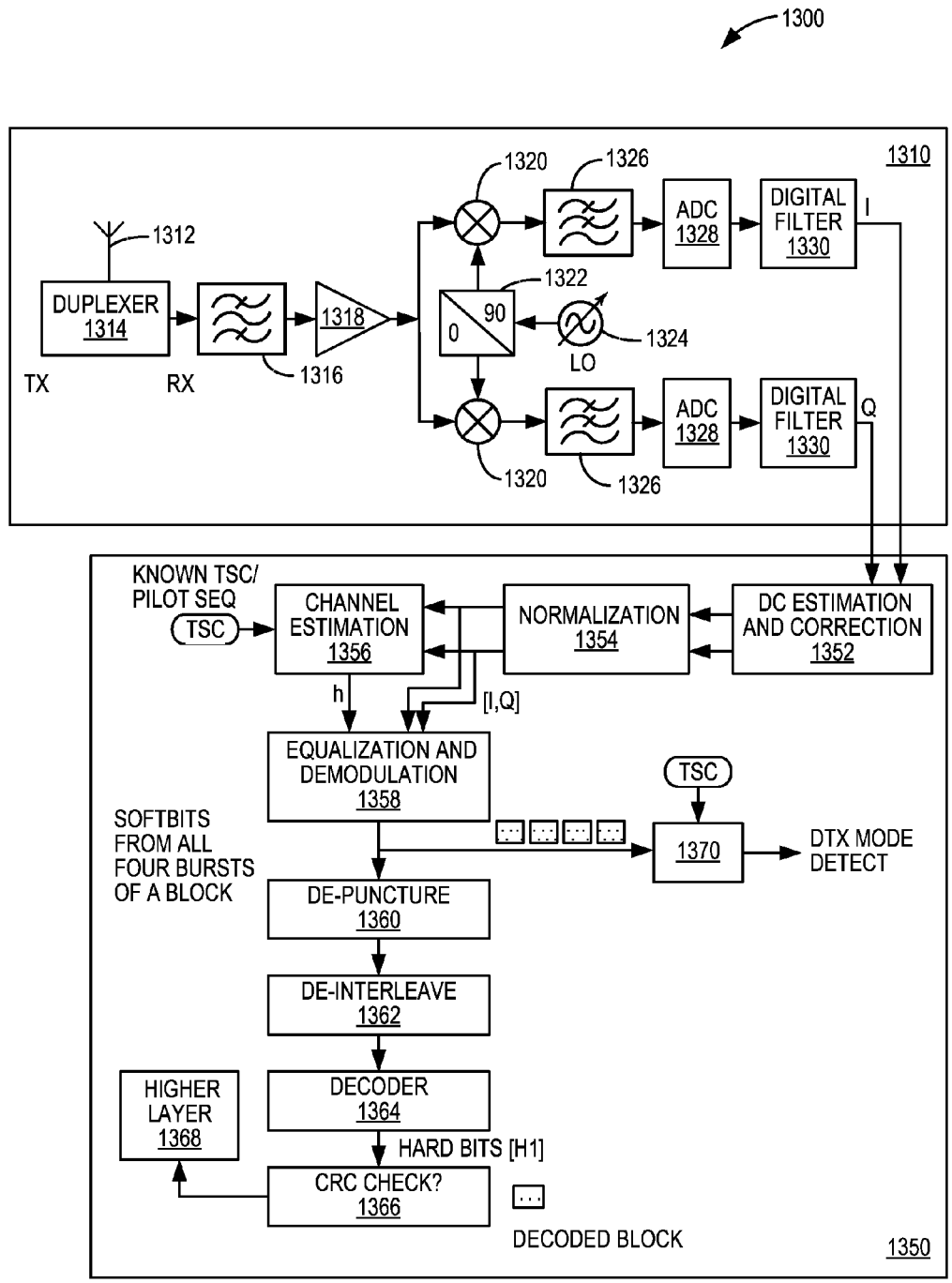
FIG. 13 is a schematic diagram illustrating features of a wireless receiver adapted to carry out one or more of the disclosed techniques for DTX detection.

FIG. 13 is a schematic diagram illustrates features of an example wireless receiver apparatus, adapted to carry out one or more of the techniques detailed above. Wireless receiver apparatus 1300 includes receiver circuitry 1310, which is adapted to receive transmission bursts in a wireless communications network and to produce received signal samples corresponding to said transmission bursts, as well as a processing circuit 1350, which is adapted to control the receiver circuit and to process the received signal samples. This processing, in various embodiments, may include the carrying out of one or more of the techniques detailed above, including, for example, one or several of the methods illustrated in FIGS. 7, 8, 10, 11, and 12.

The example receiver circuitry 1310 illustrated in FIG. 13 comprises receiver components that are well known to those familiar with wireless receiver design, including antenna 1312, duplexer 1314, receiver filter 1316, and low-noise amplifier 1318. The filtered and amplified signal output from low-noise amplifier 1318 is split and fed into two signal branches, an in-phase (I) branch and a quadrature (Q) branch. In each branch, the signal is down-converted, using mixers 1320 and a local oscillator signal derived from local oscillator 1324. Hybrid circuit 1322 introduces a phase shift of 90 degrees between the local oscillator signals provided to the I and Q branches—as a result, the signal output from mixer 1320 in the I (top) branch is 90 degrees out of phase with the corresponding signal in the Q (bottom) branch. Both of these signals are filtered, using low-pass filters 1326, converted to digital signals using analog-to-digital converters (ADCs) 1328, and filtered, using digital filters 1330. The result is a series of I/Q samples output from receiver circuitry 1310 to processing circuit 1350.

It should be appreciated that the receiver configuration shown in FIG. 13 is but one example of many possible receiver circuit configurations. It should also be appreciated that receiver circuit 1310 will often be accompanied by corresponding transmitter circuitry. In any case, the detailed design and operation of receiver circuits are well known to wireless receiver designers and are unnecessary to a full understanding of the presently disclosed techniques.

As shown in FIG. 13, processing circuit 1350 comprises a number of functional modules that process the I and Q samples provided by receiver circuit 1310. As an initial matter, these I/Q samples are subjected to DC estimation and correction, as well as normalization, using DC correction unit 1352 and normalization unit 1354. Using the known TSC sequence, channel estimation unit 1356 provides an estimate h of the propagation channel, as well as an estimated location for the TSC sequence within the series of I/Q samples.

Equalization and demodulation unit 1358 demodulates the I/Q samples, based on the channel estimate provided by channel estimation unit 1356. In normal processing of a GSM signal, soft bits from all four bursts of each block are provided. These soft bits are then de-punctured, de-interleaved, and decoded, in units 1360, 1632, and 1364, respectively. The cyclic redundancy code (CRC) for the block is checked, using CRC check unit 1366; decoded blocks that pass the check are passed to higher layer processing unit 1368.

For detecting the DTX mode, equalization and demodulation unit is adapted to produce bit estimates corresponding to at least a subset of the received signal samples that correspond to the expected location of the TSC within the burst. These bit estimates are provided to comparison unit 1370, which compares the bit estimates to the TSC, to determine the DTX mode for the block, i.e., whether or not the TSC is present in the first burst of the block. While FIG. 13 shows the use of only a single TSC, it will be appreciated that wireless receiver 1300 may be readily adapted to perform DTX mode detection in a VAMOS scenario, as well. Processing circuit 1350 may further be adapted to perform improved calculation of the imbalance parameter in a VAMOS scenario, as discussed earlier, and/or to perform interference cancellation and demodulation in the VAMOS scenario.

Figure 14:
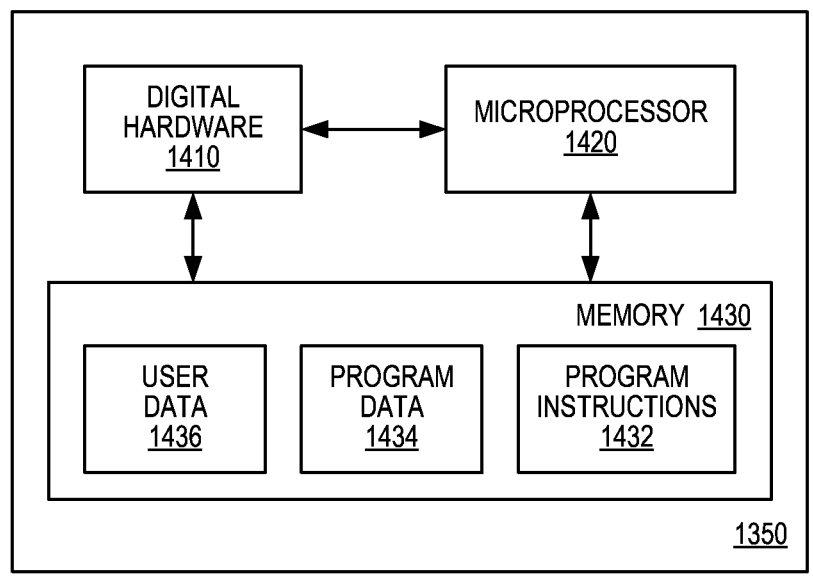
FIG. 14 is a block diagram illustrating an example wireless receiver adapted to carry out one or more of the techniques disclosed herein.

In FIG. 13, processing circuit 1350 is shown as comprising a number of functional modules. It should be appreciated that these functional modules may be implemented in several different ways, using digital hardware, or one or more microprocessors configured with appropriate firmware and/or software, or with a combination of both. FIG. 14 illustrates one example implementation of processing circuit 1350, where processing circuit 1350 comprises a combination of digital hardware 1410 and a microprocessor unit 1420.

Microprocessor unit 1420 is configured to carry out program instructions 1432 stored in memory unit 1430, which also includes program data 1434 and user data 1436. It will be appreciated that program instructions 1432 may comprise program instructions for carrying out any one or more of the techniques detailed herein, as well as additional program instructions for controlling wireless receiver 1300 and for operating within the wireless communications network. For example, it will be understand that in several embodiments, processing circuit 1350 in particular, and wireless receiver 1300 more generally, are adapted to operate in a wireless communication network according to one or more wireless telecommunications standards, such as the GSM standards maintained by 3GPP. More particularly, processing circuit 1350, in several embodiments, is adapted, given a first sequence of bits that is known by the wireless receiver to be included in transmission bursts targeted to the wireless receiver and given a series of received signal samples corresponding to an expected transmission burst for the wireless receiver, to estimate a channel response and a location for the first sequence within the series, the location for the first sequence indicating a subset of the received signal samples in the series, to generate a plurality of bit estimates from the subset of received signal samples, based on the estimated channel response, to compare the bit estimates to bits in the first sequence of bits, and to determine whether a valid burst for the wireless receiver is present, based on said comparing. In various embodiments, the processing circuit 1350 may be further adapted to carry out one or more of the several variants of this technique detailed above.

With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings. Instead, the present invention is limited only by the following claims and their legal equivalents.

What is claimed is:

1. A method, in a first wireless receiver, for detecting discontinuous transmission (DTX), the method comprising:
    given a first sequence of bits that is known by the first wireless receiver to be included in transmission bursts targeted to the first wireless receiver and given a series of received signal samples corresponding to an expected transmission burst for the first wireless receiver, estimating a channel response and a location for the first sequence within the series, the location for the first sequence indicating a subset of the received signal samples in the series;
    generating a plurality of bit estimates from the subset of received signal samples, based on the estimated channel response;
    comparing the bit estimates to bits in the first sequence of bits, wherein said comparing comprises comparing each bit estimate to a corresponding bit from the first sequence of bits and counting a number of matches between the bit estimates and corresponding bits in the first sequence of bits; and
    determining whether a valid burst for the first wireless receiver is present, based on said comparing.

2. The method of claim 1, wherein determining whether a burst for the first wireless receiver is present comprises concluding that a burst is present if the number of matches is greater than a predetermined threshold.

3. The method of claim 1, wherein generating the plurality of bit estimates from the subset of received signal samples comprises:
    demodulating only the subset of received signal samples, to obtain a series of demodulated soft bits; and
    obtaining the bit estimates for said comparing by converting the soft bits to hard bits.

4. The method of claim 3, further comprising discarding one or more soft bits at each end of the series of demodulated soft bits before converting the remaining soft bits to hard bits.

5. The method of claim 4, wherein the first sequence of bits is 26 bits in length, and wherein 16 soft bits are converted to 16 hard bits for comparing to corresponding bits in the first sequence.

6. A method, in a first wireless receiver, for detecting discontinuous transmission (DTX), the method comprising:
    given a first sequence of bits that is known by the first wireless receiver to be included in transmission bursts targeted to the first wireless receiver and given a series of received signal samples corresponding to an expected transmission burst for the first wireless receiver, estimating a channel response and a location for the first sequence within the series, the location for the first sequence indicating a subset of the received signal samples in the series;
    generating a plurality of bit estimates from the subset of received signal samples, based on the estimated channel response;
    comparing the bit estimates to bits in the first sequence of bits; and
    determining whether a valid burst for the first wireless receiver is present, based on said comparing;
    wherein generating the plurality of bit estimates from the subset of received signal samples comprises:
        copying the subset of received signal samples to a first position in the series of received signal samples and copying the subset of received signal samples to a second position in the series of received signal samples, wherein the first and second positions are before and after the location for the first sequence, respectively; and
        demodulating the received signal samples in the first and second positions in the series, to obtain the bit estimates for comparing.

7. The method of claim 6, wherein the first and second positions correspond to information bit positions in a normal burst, as defined by GSM specifications.

8. The method of claim 6, wherein said demodulating the received samples in the first and second positions produces a first and second series of soft bits, wherein generating the plurality of bit estimates further comprises:
    discarding one or more soft bits at each end of the first and second series of demodulated soft bits; and
    obtaining the bit estimates for said comparing by converting the remaining soft bits to hard bits.

9. The method of claim 8, wherein the first sequence of bits is 26 bits in length, and wherein 16 soft bits from the first series and 16 soft bits from the second series are converted to hard bits for said comparing.

10. The method of claim 1, further comprising skipping channel decoding of one or more subsequent transmission bursts in response to determining that a burst is not present, based on said comparing.

11. A method, in a first wireless receiver, for detecting discontinuous transmission (DTX), the method comprising:
    given a first sequence of bits that is known by the first wireless receiver to be included in transmission bursts targeted to the first wireless receiver and given a series of received signal samples corresponding to an expected transmission burst for the first wireless receiver, estimating a channel response and a location for the first sequence within the series, the location for the first sequence indicating a subset of the received signal samples in the series;
    generating a plurality of bit estimates from the subset of received signal samples, based on the estimated channel response;
    comparing the bit estimates to bits in the first sequence of bits;
    determining whether a valid burst for the first wireless receiver is present, based on said comparing;

given a second sequence of bits that is known by the first wireless receiver to be included in transmission bursts targeted to a second wireless receiver in the event that orthogonal transmission bursts are simultaneously transmitted to the first and second wireless receivers, estimating a second channel response and a location for the second sequence within the series of received signal samples, the location for the second sequence indicating a second subset of the received signal samples in the series;

generating a plurality of second bit estimates from the second subset of received signal samples, based on the second estimated channel response;

comparing the second bit estimates to bits in the second sequence of bits; and determining whether a burst for the second wireless receiver is present, based on said comparing of the second bit estimates to bits in the second sequence of bits.

12. The method of claim 11, further comprising, in response to determining that bursts for both the first and second wireless receivers are present, estimating a ratio of received powers for the bursts for the first and second wireless receivers.

13. The method of claim 11, further comprising, in response to determining that bursts for both the first and second wireless receivers are present:

demodulating first information bits targeted to the second wireless receiver, from the received signal samples;

generating reduced-interference signal samples by subtracting an estimated interference signal from the received signal samples, wherein the estimated interference signal is based on the demodulated first information bits; and demodulating second information bits targeted to the first wireless receiver, from the reduced-interference signal samples.

14. A wireless receiver, comprising a receiver circuit adapted to receive transmission bursts in a wireless communications network and to produce received signal samples corresponding to said transmission bursts, and a processing circuit adapted to control the receiver circuit, to process the received signal samples, and, given a first sequence of bits that is known by the wireless receiver to be included in transmission bursts targeted to the wireless receiver and given a series of received signal samples corresponding to an expected transmission burst for the wireless receiver, to:

estimate a channel response and a location for the first sequence within the series, the location for the first sequence indicating a subset of the received signal samples in the series;

generate a plurality of bit estimates from the subset of received signal samples, based on the estimated channel response;

compare the bit estimates to bits in the first sequence of bits by comparing each bit estimate to a corresponding bit from the first sequence of bits and counting a number of matches between the bit estimates and corresponding bits in the first sequence of bits; and determine whether a valid burst for the wireless receiver is present, based on said comparing.

15. The wireless receiver of claim 14, wherein the processing circuit is adapted to conclude that a burst is present if the number of matches is greater than a predetermined threshold.

16. The wireless receiver of claim 14, wherein the processing circuit is adapted to generate the plurality of bit estimates from the subset of received signal samples by:

demodulating only the subset of received signal samples, to obtain a series of demodulated soft bits; and obtaining the bit estimates for said comparing by converting the soft bits to hard bits.

17. The wireless receiver of claim 16, wherein the processing circuit is further adapted to discard one or more soft bits at each end of the series of demodulated soft bits before converting the remaining soft bits to hard bits.

18. The wireless receiver of claim 17, wherein the first sequence of bits is 26 bits in length, and wherein the processing circuit is adapted to convert 16 soft bits to 16 hard bits for comparing to corresponding bits in the first sequence.

19. A wireless receiver, comprising a receiver circuit adapted to receive transmission bursts in a wireless communications network and to produce received signal samples corresponding to said transmission bursts, and a processing circuit adapted to control the receiver circuit, to process the received signal samples, and, given a first sequence of bits that is known by the wireless receiver to be included in transmission bursts targeted to the wireless receiver and given a series of received signal samples corresponding to an expected transmission burst for the wireless receiver, to:

estimate a channel response and a location for the first sequence within the series, the location for the first sequence indicating a subset of the received signal samples in the series;

generate a plurality of bit estimates from the subset of received signal samples, based on the estimated channel response;

compare the bit estimates to bits in the first sequence of bits; and determine whether a valid burst for the wireless receiver is present, based on said comparing;

wherein the processing circuit is adapted to generate the plurality of bit estimates from the subset of received signal samples by:

copying the subset of received signal samples to a first position in the series of received signal samples and copying the subset of received signal samples to a second position in the series of received signal samples, wherein the first and second positions are before and after the location for the first sequence, respectively; and demodulating the received signal samples in the first and second positions in the series, to obtain the bit estimates for comparing.

20. The wireless receiver of claim 19, wherein the first and second positions correspond to information bit positions in a normal burst, as defined by GSM specifications.

21. The wireless receiver of claim 19, wherein said demodulating the received samples in the first and second positions produces a first and second series of soft bits, and wherein the processing circuit is further adapted to generate the plurality of bit estimates by:

discarding one or more soft bits at each end of the first and second series of demodulated soft bits; and obtaining the bit estimates for said comparing by converting the remaining soft bits to hard bits.

22. The wireless receiver of claim 21, wherein the first sequence of bits is 26 bits in length, and wherein the processing circuit is adapted to convert 16 soft bits from the first series and 16 soft bits from the second series to hard bits for said comparing.

23. The wireless receiver of claim 14, wherein the processing circuit is further adapted to skip channel decoding of one or more subsequent transmission bursts in response to determining that a burst is not present, based on said comparing.

24. A wireless receiver, comprising
- a receiver circuit adapted to receive transmission bursts in a wireless communications network and to produce received signal samples corresponding to said transmission bursts, and
- a processing circuit adapted to control the receiver circuit, to process the received signal samples, and, given a first sequence of bits that is known by the wireless receiver to be included in transmission bursts targeted to the wireless receiver and given a series of received signal samples corresponding to an expected transmission burst for the wireless receiver, to:
  - estimate a channel response and a location for the first sequence within the series, the location for the first sequence indicating a subset of the received signal samples in the series;
  - generate a plurality of bit estimates from the subset of received signal samples, based on the estimated channel response;
  - compare the bit estimates to bits in the first sequence of bits; and
  - determine whether a valid burst for the wireless receiver is present, based on said comparing;

wherein the processing circuit, given a second sequence of bits that is known by the wireless receiver to be included in transmission bursts targeted to a second wireless receiver in the event that orthogonal transmission bursts are simultaneously transmitted to the wireless receiver and to the second wireless receiver, is further adapted to:
- estimate a second channel response and a location for the second sequence within the series of received signal samples, the location for the second sequence indicating a second subset of the received signal samples in the series;
- generate a plurality of second bit estimates from the second subset of received signal samples, based on the second estimated channel response;
- compare the second bit estimates to bits in the second sequence of bits; and
- determine whether a burst for the second wireless receiver is present, based on said comparing of the second bit estimates to bits in the second sequence of bits.

25. The wireless receiver of claim 24, wherein the processing circuit is further adapted, in response to determining that bursts are present for both the wireless receiver and the second wireless receiver, to estimate a ratio of received powers for the bursts for the first and second wireless receivers.

26. The wireless receiver of claim 24, wherein the processing circuit is further adapted, in response to determining that bursts are present for both the wireless receiver and the second wireless receiver, to:
- demodulate first information bits targeted to the second wireless receiver, from the received signal samples;
- generate reduced-interference signal samples by subtracting an estimated interference signal from the received signal samples, wherein the estimated interference signal is based on the demodulated first information bits; and
- demodulate second information bits targeted to the wireless receiver, from the reduced-interference signal samples.

* * * * *

UNITED STATES PATENT AND TRADEMARK OFFICE
CERTIFICATE OF CORRECTION

PATENT NO. : 9,167,522 B2  
APPLICATION NO. : 13/848322  
DATED : October 20, 2015  
INVENTOR(S) : Das Page 1 of 1

It is certified that error appears in the above-identified patent and that said Letters Patent is hereby corrected as shown below:

Specification

In Column 6, Line 52, delete "for DX" and insert -- for DTX --, therefor.

In Column 18, Line 27, delete "1360, 1632," and insert -- 1360, 1362, --, therefor.

Claims

In Column 21, Line 38, in Claim 14, delete "comprising" and insert -- comprising: --, therefor.

In Column 22, Line 16, in Claim 19, delete "comprising" and insert -- comprising: --, therefor.

In Column 23, Line 5, in Claim 24, delete "comprising" and insert -- comprising: --, therefor.

Signed and Sealed this  
Twenty-second Day of March, 2016

Michelle K. Lee  
*Director of the United States Patent and Trademark Office*